US007929422B2

(12) United States Patent
Ramalho et al.

(10) Patent No.: US 7,929,422 B2
(45) Date of Patent: Apr. 19, 2011

(54) METHOD OF MOVING A TRANSPORT CONNECTION AMONG NETWORK HOSTS

(75) Inventors: Michael Ramalho, Sarasota, FL (US); Peter Lei, Arlington Heights, IL (US); Randall Stewart, Chapin, SC (US)

(73) Assignee: Cisco Technology, Inc., San Jose, CA (US)

( * ) Notice: Subject to any disclaimer, the term of this patent is extended or adjusted under 35 U.S.C. 154(b) by 1277 days.

(21) Appl. No.: 11/031,354

(22) Filed: Jan. 6, 2005

(65) Prior Publication Data
US 2006/0164974 A1 Jul. 27, 2006

(51) Int. Cl.
G01R 31/08 (2006.01)
(52) U.S. Cl. .................. 370/219; 370/392; 709/228
(58) Field of Classification Search .................. 370/219, 370/389; 709/228
See application file for complete search history.

(56) References Cited

U.S. PATENT DOCUMENTS

| | | | |
|---|---|---|---|
| 7,116,634 B1* | 10/2006 | Hanselmann | 370/219 |
| 7,120,792 B1* | 10/2006 | Jacobson et al. | 713/153 |
| 2001/0055380 A1* | 12/2001 | Benedyk et al. | 379/219 |
| 2002/0129146 A1* | 9/2002 | Aronoff et al. | 709/225 |
| 2003/0086367 A1* | 5/2003 | Bengston et al. | 370/216 |
| 2003/0108034 A1* | 6/2003 | Yu | 370/352 |
| 2003/0120716 A1* | 6/2003 | McClellan et al. | 709/201 |
| 2004/0028009 A1* | 2/2004 | Dorenbosch et al. | 370/329 |
| 2005/0013245 A1* | 1/2005 | Sreemanthula et al. | 370/229 |
| 2005/0055708 A1* | 3/2005 | Gould et al. | 725/25 |
| 2005/0157726 A1* | 7/2005 | Vesterinen | 370/395.5 |
| 2006/0153202 A1* | 7/2006 | Dantu et al. | 370/395.52 |
| 2006/0174039 A1* | 8/2006 | Stewart et al. | 709/245 |

OTHER PUBLICATIONS

Kohler, Eddie et al., "Datagram Congestion Protocol (DCCP)," Internet Draft to expire on Apr. 25, 2005, The Internet Society (2004), Oct. 25, 2005, pp. 1-112.
Kohler, Eddie, "Datagram Congestion Protocol Mobility and Multihoming," Internet Draft Expiring Jan. 2005, The Internet Society (2004), Jul. 12, 2004, pp. 1-15.
Stewart, R. et al., "Stream Control Transmission Protocol," RFC 2960, The Internet Society (2004), Oct. 2000, pp. 1-120.
Stewart R., et al., "Stream Control Transmission Protocol (SCTP) Dynamic Address Reconfiguration," draft-ietf-tsvwg-addip-sctp-09. txt, The Internet Society (2004), Jun. 10, 2004, pp. 1-35.
Stewart, Randall R., et al., *Stream Control Transmission Protocol (SCTP): A Reference Guide*, Addison Wesley, 2002. VII-XX (Table of Contents), pp. 1-351 (Text).

* cited by examiner

*Primary Examiner* — Seema S Rao
*Assistant Examiner* — Sai-Ming Chan
(74) *Attorney, Agent, or Firm* — Hickman Palermo Truong & Becker LLP

(57) ABSTRACT

A method is disclosed for providing fault tolerance of an application over a Stream Control Transmission Protocol (SCTP) connection. A method for moving a transport connection from a first host to a second host on a network is also described. After establishing a transport connection between the first host and a peer host, first information about the transport connection is transferred to the second host. Upon the first host becoming unavailable, the second host sends to the peer host a request to update the state of the transport connection. The peer host then updates the transport connection. Without resetting the transport connection, the second host then establishes the same transport connection with the peer host.

40 Claims, 6 Drawing Sheets

METHOD OF MOVING A TRANSPORT CONNECTION AMONG NETWORK HOSTS

FIELD OF THE INVENTION

The present invention generally relates to high-availability computer systems. The invention relates more specifically to providing a high-availability computer system by moving its transport connections to a backup system without resetting them.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

1. Stream Control Transmission Protocol

Stream Control Transmission Protocol (SCTP) is a network packet data transport protocol that provides for transparent transfer of data between computer systems, or hosts, and is responsible for end-to-end error recovery and flow control (for a detailed description of SCTP, see Randall Stewart & Qiaobing Xie, *Stream Control Transmission Protocol (SCTP), A Reference Guide*, ISBN 0-201-72186-4, (Addison-Wesley, 2002)). SCTP is a reliable transport protocol operating on top of a potentially unreliable connectionless packet service protocol, such as the Internet Protocol (IP), and offers acknowledged error-free non-duplicated transfer of datagrams, or packets.

SCTP is a general-purpose transport protocol for message-oriented applications. It was designed by the Internet Engineering Task Force (IETF) SIGTRAN working group, which released the SCTP standard draft document RFC2960 in October 2000. SCTP provides Transport Layer connectivity for computer applications, processes, services, or daemons that run in layers above the Transport Layer. SCTP also provides support for multi-homed hosts, and can be used as the transport protocol for upper-layer applications that require monitoring and detection of loss of session. For such upper-layer applications, SCTP uses a number of path/session failure detection mechanisms, such as a heartbeat mechanism, to actively monitor the connectivity of the session.

SCTP is designed around the concept of a plurality of data streams within a transport connection. The data units transported over an SCTP transport connection are referred to as SCTP packets. If SCTP runs over IP, an SCTP packet forms the payload of an IP packet.

The hosts communicating over an SCTP transport connection are usually represented by SCTP endpoints. An SCTP endpoint is the logical sender/receiver of SCTP packets. On a multi-homed host, such as a computer system that can be reached at more than one network address, an SCTP endpoint is represented to its peers as a combination of a set of eligible destination transport addresses to which SCTP packets can be sent and a set of eligible source transport addresses from which SCTP packets can be received. All transport addresses used by an SCTP endpoint must use the same port number, but can use multiple IP addresses. A transport address used by an SCTP endpoint cannot be used by another SCTP endpoint. A transport address is defined by a Network Layer address, a Transport Layer protocol and a Transport Layer port number. For example, in the case of SCTP running over IP, a transport address is defined by the combination of an IP address and an SCTP port number (where SCTP is the Transport Layer protocol).

An SCTP association is a protocol relationship between SCTP endpoints, and is composed of the two SCTP endpoints and the protocol state information. The protocol state information includes, among other parameters, one or more verification tags, a set of transmission sequence numbers, and a set of stream sequence numbers. An SCTP association can be identified by the transport addresses used by the endpoints in the association. Two SCTP endpoints cannot have more than one SCTP association between them at any given time.

An SCTP packet is composed of a common header and one or more chunks. The common header contains fields for a source port number, a destination port number, a verification tag, and a checksum. The source port numbers and the destination port numbers are used for the identification of an SCTP association. SCTP uses the same port concept used by the Transmission Control Protocol (TCP) and the User Datagram Protocol (UDP). The verification tag is a 32-bit randomly generated value that is specific to an SCTP association, and is exchanged between the SCTP endpoints at the SCTP association startup. The verification tag serves as a key that allows a receiver to verify that the SCTP packet belongs to the current SCTP association. The checksum is used for the detection of transmission errors.

A chunk is a unit of information within an SCTP packet, consisting of a chunk header and chunk-specific content. Multiple chunks may be multiplexed into one SCTP packet. A chunk may contain either control information or upper-layer application data, and may be of variable length. A chunk header includes a chunk type field, used to distinguish data chunks and different types of control chunks, chunk flag field for chunk specific flags, and a chunk length field.

The chunk-specific content occupies the rest of the chunk, and is represented as a value field. The original SCTP specification defined several chunk types for standard use, including a Payload Data Chunk (DATA, chunk type value 0×0), Initiation Chunk (INIT, chunk type value 0 ×1), Initiation Acknowledgement Chunk (INIT ACK, chunk type value 0×2), Selective Acknowledgement Chunk (SACK, chunk type value 0×3), Heartbeat Request Chunk (HEARTBEAT, chunk type value 0×4), Heartbeat Acknowledgement (HEARTBEAT ACK, chunk type value 0×5), State Cookie Chunk (COOKIE ECHO, chunk type value 0×A), and Cookie Acknowledgement (COOKIE ACK, chunk type value 0×B). Subsequently, the SCTP specification has been extended to include the Address Configuration Change Chunk (AS-CONF, chunk type value 0×C1), the Address Configuration Acknowledgement Chunk (ASCONF ACK, chunk type value 0×80), and the Stream Reset Chunk (STREAM RESET, chunk type value 0×82). A 32-bit Transmission Sequence Number (TSN) is attached to each chunk containing upper-layer application data to permit the receiving SCTP endpoint to acknowledge its receipt and detect duplicate deliveries.

SCTP supports different streams of messages within one SCTP association. A message is a unit of data in a chunk sent by an upper-layer application over the SCTP association from one SCTP endpoint to another. A stream is a uni-directional logical channel established from one SCTP endpoint to another associated SCTP endpoint, within which all data messages are delivered in sequence unless out-of-order delivery is requested by the upper-layer application. A 16-bit Stream Sequence Number (SSN) is associated with each stream, and is maintained internally by SCTP to ensure sequenced delivery of the data messages within a given stream to the upper-layer application. One Stream Sequence Number is attached to each data message.

SCTP operates on two levels—the SCTP association level and the stream level. At the SCTP association level, the reliable transfer of SCTP packets is ensured by using checksums, transmission sequence numbers, and a selective retransmission mechanism. At the stream level, ordered delivery of data messages to an upper-layer application is ensured by using Stream Sequence Numbers (SSNs).

The establishing of an SCTP association between two SCTP endpoints is completed on the SCTP association level. When an upper-layer application wants to start an SCTP association, it makes a standard SCTP API call to its SCTP endpoint (the sending SCTP endpoint) to call the SCTP stack and initialize association data structures and association state parameters. The association state parameters include at least the initial TSNs, the number of outbound streams, the number of inbound streams, and a verification tag. The initial association state parameters are then assembled in an INIT chunk. The sending SCTP endpoint sends this INIT chunk to one transport address (e.g. a combination of IP-address and a port number) of the desired SCTP endpoint (the receiving SCTP endpoint). The sending SCTP endpoint then starts a timer that triggers repetitive sending of the INIT chunk until an INIT ACK chunk is received from the receiving SCTP endpoint. If after the INIT chunk was sent a configurable number times and no INIT ACK chunk was received from the receiving SCTP endpoint, then the sending SCTP endpoint reports an error to the upper-layer application, and the receiving SCTP endpoint is considered unreachable.

The receiving SCTP endpoint receives the INIT chunk (with the request to set up an SCTP association), and analyzes the data contained in this chunk. From this data the receiving SCTP endpoint generates all the values needed to establish an SCTP association at its side, including the verification tag, the initial TSNs, and the numbers of the streams in the inbound and the outbound directions. The receiving SCTP endpoint then generates a secure hash of these values and a secret key. The values are then put into a State Cookie Parameter. The receiving SCTP endpoint then sends its initial association setup parameters and the State Cookie Parameter to the sending SCTP endpoint in an INIT ACK chunk. The receiving SCTP endpoint then saves none of this state information and waits until the sending SCTP endpoint sends back the State Cookie parameter in a COOKIE ECHO chunk.

When the sending SCTP endpoint receives an INIT ACK chunk from the receiving SCTP endpoint, it stops the timer, puts the State Cookie parameter from the receiving SCTP endpoint's INIT-ACK chunk into a new COOKIE ECHO chunk, and returns it to the receiving SCTP endpoint. The sending SCTP endpoint then starts a cookie timer that triggers repetitive sending of the new COOKIE ECHO chunk until a COOKIE ACK chunk is received from the receiving SCTP endpoint. If no COOKIE ACK chunk is received after a configurable number COOKIE ECHO chunks have been sent to the receiving SCTP endpoint, the sending SCTP endpoint reports to the upper-layer application that the receiving SCTP endpoint is unreachable.

Upon receipt of the COOKIE ECHO chunk from the sending SCTP endpoint, the receiving SCTP endpoint unpacks the data contained in the chunk and verifies that the chunk was sent by the sending SCTP endpoint. The data contained in the chunk, specifically the State Cookie parameter, is validated against the secret key and includes at least the verification tag, the number of inbound and outbound streams, and the initial TSNs. The receiving SCTP endpoint then uses the values of these parameters to initialize an SCTP association with the sending SCTP endpoint by creating and initializing the data structures necessary to support the association. The receiving SCTP endpoint then sends a COOKIE ACK chunk to the sending SCTP endpoint, and is thereby ready to accept data or send data chunks over the SCTP association. The sending SCTP endpoint receives and verifies the COOKIE ACK chunk, and thereby can start transmitting or receiving upper-layer application data messages over the SCTP association.

If a host is multi-homed on an IP network, its associated SCTP endpoint informs the other SCTP endpoint in the association about all of the host's IP addresses with the NIT chunk's address parameters (if the multi-homed host initiates the establishing of the association), or with the INIT ACK chunk's address parameters (if the multi-home host does not initiate the establishing of the association). If no explicit network addresses are contained in the INIT or INIT ACK chunks, the source IP address of the IP packet that carries the SCTP packet is used. This mechanism eases application of SCTP when Network Address Translation (NAT) is involved, e.g. at the edge of large private IP networks. To further facilitate the use of SCTP along with NAT, an additional optional feature has been introduced into the SCTP specification that allows the usage of host names in addition to or instead of IP addresses.

All data chunks sent from an SCTP endpoint are numbered with the current Transmission Sequence Number (TSN) for the endpoint. This enables the detection of loss and duplication of data chunks. Acknowledgements sent from an SCTP endpoint that receives the data chunks are based on this TSN. When the SCTP endpoint that receives the data chunks detects one or more gaps in the sequence of data chunks, each received SCTP packet is acknowledged by sending a Selective Acknowledgement (SACK) control chunk that reports all gaps. Whenever the SCTP endpoint that sends data chunks receives four consecutive SACKs reporting the same data chunk missing, this data chunk is immediately retransmitted (fast retransmit).

The stream level utilizes a flexible delivery mechanism that is based on the concept of multiple streams within an SCTP association. With respect to an SCTP endpoint, the SCTP association includes a set of inbound streams and a set of outbound streams, where the SCTP endpoint receives data through the inbound streams, and transmits data through the outbound streams. Chunks belonging to one or several streams may be bundled and transmitted in one SCTP packet. Every data chunk correctly received by an SCTP endpoint is delivered to the stream level.

At the stream level, an upper-layer application transmitting over an SCTP association may assign each data message to one of several streams within the association. When the SCTP association is established, the number of available streams per direction is exchanged between the associated SCTP endpoints. Within each stream, SCTP assigns independent Stream Sequence Numbers (SSNs) to the data messages. These numbers are used at the SCTP endpoint receiving the data messages to determine the sequence of delivery to the upper-layer application. SCTP performs in-sequence delivery per stream for all messages that are not marked for unordered delivery.

2. High-Availability Computer Systems

One past approach for providing a high-availability computer system is to have a backup system that periodically determines the status of the computer system (the primary system), and when the primary system fails, the backup system takes over for the primary system by assuming its identity. Under this approach, the backup system communicates with and monitors the primary system via a special LAN (Local Area Network) connection or some other network connection. Usually, high-availability implemented using this approach does not require special hardware for the connection between the primary system and the backup system. Under this approach, when the primary system comes back to life, the primary system continues to perform its duties as a primary, and the backup system assumes its own identity and reverts back to perform as a backup.

This approach has a number of disadvantages. Consider, for example, a primary computer system that is a host in an IP network using a reliable transport protocol such as TCP. When the primary host fails, its backup host must establish transport-level connectivity to all network clients that had TCP connections to the primary host. The establishment of transport-level connectivity between the backup host and a client requires: (1) establishment of a TCP connection at the backup host (assuming the backup host had no prior TCP connection to the client), and (2) re-setting the TCP connection at the client. Both the establishment and the re-setting of a TCP connection require changing the source and/or destination IP address for the connection, as well as re-initialization of the data structures that support the connection. If the client runs an application that is not designed to support TCP connection re-establishment or failover, the entire client application may need to be restarted in order to establish transport-level connectivity with the backup host. Even if the application is designed to support TCP connection re-establishment or failover, there is still undesirable added delay incurred in setting the new transport connections at the backup host. Moreover, the detailed transport connection state of the TCP connection needs to be exactly mirrored in the backup host. As the TCP connection is very dynamic, mirroring it to the backup host that may be physically separate from the primary platform (by many tens of milliseconds or hundred of miles) may not be practical or feasible.

Another disadvantage of this approach is that the backup system must timely discover the failure of the primary system, which requires more elaborate and frequent communications between the two systems. The backup system must discover the failure of the primary before a client connected to the primary discovers the failure, because otherwise, upon discovering that the primary has failed, the client might simply conclude that the primary system is unavailable and might give up trying to connect to it. Thus, even if later the backup system takes over the primary, there will be no way for the backup system to know of, and establish connection to, the client that gave up trying to connect to the primary.

Another approach for providing high-availability computer systems is to provide special hardware for communications between the primary and the backup computer systems. Under this approach, if the primary system fails the backup assumes the identity of the primary system. The special hardware is used by the primary system to constantly update the backup system with the state of the applications running on the primary system, and with the state of all transport connections between the primary system and any clients connected to it. An example of special hardware that can be used to implement this approach is a shared reflective memory that allows instant updates to the backup system whenever any changes to application states or transport connections occur in the primary system.

One of the many disadvantages of this approach is the high cost of the special hardware necessary for the communications between the primary and the backup systems. In other words, this approach gets rid of the necessity to reset transport connections and to transfer application state between the primary and the backup systems at the expense of higher hardware costs. Other significant disadvantages of this approach are the higher complexity and the higher costs involved in setting up and maintaining the failover scheme described above.

Based on the foregoing, there is a clear need for techniques providing a high-availability computer system with the ability to preserve and move, to a backup system, the transport connections that exist between the computer system and its clients without employing special hardware.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
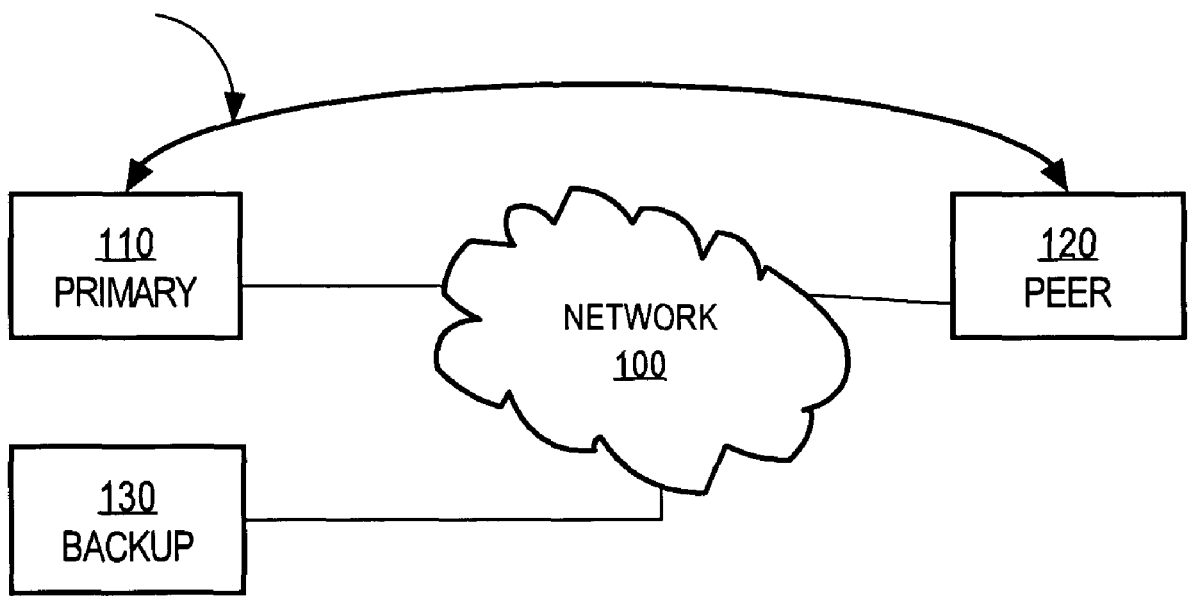
FIG. 1a is a block diagram that illustrates an overview of a system on which an embodiment of a method for moving a Stream Control Transmission Protocol (SCTP) association from one host to another may be implemented.

A method and apparatus for moving a transport connection between computer hosts is described. Techniques for providing fault tolerance of a computer application over a Stream Control Transmission Protocol (SCTP) transport connection are also provided. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
    2.1 Structural Overview
    2.2 Functional Overview of an Embodiment 3.0 Method of Moving an SCTP Association Without Resetting It
   3.1 Transferring to the Backup Host Information About the SCTP Association
   3.2 Monitoring the Availability of the Primary Host
   3.3 Updating the SCTP Association at the Peer Host
      3.3.1 The ASCONF Chunk
      3.3.2 The STREAM RESET Chunk
      3.3.3 Sending Information About the SCTP Association to the Backup Host
   3.4 Establishing the SCTP Association at the Backup Host Without Resetting It
4.0 Method of Moving a DCCP Connection Without Resetting It
5.0 Implementation Mechanisms—Hardware Overview
6.0 Extensions and Alternatives 1.0 General Overview The techniques described herein are in no way limited to any particular embodiment or aspect of an embodiment. An example embodiment of the techniques described herein is provided with respect to SCTP transport connections. This embodiment is described for illustrative purposes only, and the present invention is applicable to transport connections established under any message-oriented protocol that provides for dynamic network address reconfiguration, such as, for example, transport connections established under Datagram Congestion Control Protocol (DCCP) or Transmission Control Protocol (TCP).

The needs identified in the foregoing Background, and other needs and objects that will become apparent for the following description, are achieved in the present invention, which comprises, in one aspect, a method for moving a transport connection from a first host to a second host. After establishing a transport connection between the first host and a peer host, information about the transport connection is transferred to the second host. When the first host becomes unavailable, the second host sends to the peer host a request to update the transport connection. The peer host then updates the transport connection at its end, and the second host, without resetting any parameters or data structures of the transport connection, establishes the same transport connection with the peer host at its end. The transport connection could be an SCTP association established under SCTP, but is not limited to that context.

In one feature of the aspect, when the first host comes back on line, the first host requests from the peer host to move the transport connection back to the first host. The peer host then updates the transport connection to indicate that the connection is moving back to the first host. The second host is notified that the transport connection is moving back to the first host, and the first host re-establishes the connection to the peer host without resetting it. In a different feature of the aspect, when the first host comes back on line, it performs as a backup to the second host instead of requesting back the transport connection.

In a feature of this aspect, the transport connection is an SCTP association, and the information transferred to the second host after the establishing of the association between the first host and the peer host, includes at least one verification tag of the SCTP association. The request from the second host to the peer host to update the SCTP association includes the verification tag or tags from the information, and at least one network address of the second host. The network address of the second host may be an IP address if the SCTP association is established over IP.

In one feature of the aspect, the request from the second host to the peer host to update the SCTP association includes two separate messages. The first message includes the verification tag of the SCTP association, and the second message includes one or more network addresses of the second host. If the second host is on a network using IP as the network protocol, then the address sent to the peer host in the second message is an IP address.

In yet another feature of the aspect, updating the SCTP association at the peer host includes verifying that the verification tag received in the request from the second host belongs to the SCTP association. The peer host performs this step by matching the verification tag from the header of the SCTP packet that includes the update request to the value of the verification tag of the SCTP association that is stored in a peer host data structure. After confirming that the SCTP packet with the update request belongs to the SCTP association, the peer host adds the network address of the second host to the SCTP association. The peer host then sends information about the SCTP association to the second host at this network address. Upon receiving this information, the second host establishes the SCTP association with the peer host based on the information. The second host performs this step by initializing one or more SCTP association data structures and parameters based on parameter values included in the information.

In a feature of this aspect, the information sent to the second host from the peer host may include the stream numbers of one or more streams in the SCTP association, and one or more current Transmission Sequence Numbers (TSNs) of the association. In addition to adding the network address of the second host to the SCTP association, the peer host may delete the network address or addresses of the first host from the association.

In one feature of the aspect, the step of updating the SCTP association at the peer host includes setting the SSNs of one or more streams in the association to a predetermined value, and the step of establishing the SCTP association at the second host involves setting the SSNs of these streams at the second host to the same predetermined value. In one feature the predetermined value is zero. In a different feature the predetermined value is a number different than zero.

In one feature of the aspect, the second host monitors the first host to determine whether the first host is unavailable. The second host may use a variety of mechanisms to accomplish this including, but not limited to, utilizing the SCTP heartbeat mechanism by sending HEARTBEAT chunks to the first host.

In a feature of this aspect, a fee is charged to an entity that uses the first host when the first host establishes an SCTP association with the peer host. In a different feature, a record in a database that is associated with an entity that uses the first host is updated. The update represents charging a fee to an account of the entity for establishing an SCTP association with the peer host.

In one aspect, the present invention comprises a method for providing fault tolerance of an application over an SCTP association. A primary host runs a first instance of the application, and a backup host runs a second instance of the application. After establishing an SCTP association between the primary host and a peer host, information about the association is transferred to the backup host. The backup host monitors to determine whether the first instance of the application has become unavailable. If the first instance of the application has become unavailable, the backup host sends a request to the peer host to update the SCTP association. The peer host updates the SCTP association at its end. The backup host, without resetting the SCTP association, establishes at its end the same SCTP association with the peer host, and notifies the second instance of the application that it must take over for the first instance of the application.

In one feature of this aspect, the primary host transfers, over the SCTP association, to the peer host one or more parameters representing the state of the first instance of the application. Upon updating the SCTP association at its end in response to a request from the backup host, the peer host sends to the backup host information about the SCTP association along with the one or more parameters representing the state of the first instance of the application. Upon receiving this information, the backup host establishes the SCTP association at its end, notifies the second instance of the application that it must take over the first instance, and transfers to the second instance of the application the one or more parameters representing the state of the first instance of the application. The second instance of the application uses these one or more parameters to update its state.

In a feature of the aspect, the backup host monitors to determine whether the first instance of the application has become unavailable by monitoring to determine whether the primary host has become unavailable. The backup host may monitor to determine whether the primary host is unavailable by utilizing the SCTP heartbeat mechanism.

In one feature of the aspect, the application implements a Border Gateway Protocol (BGP), the first instance of the application on the primary host runs BGP, the second instance of the application on the backup host runs BGP, and the peer host also runs an instance of BGP. In a different feature, the primary host may establish SCTP association with more than one peer hosts, and all the peer hosts may also run instances of BGP.

In other aspects, the invention encompasses a computer apparatus and a computer-readable medium configured to carry out the foregoing steps.

2.0 Structural and Functional Overview 2.1 Structural Overview

FIG. 1a is a block diagram that illustrates an overview of a system on which an embodiment of a method for moving an SCTP association from one host to another may be implemented. A primary host 110, a backup host 130, and a peer host 120 are communicatively coupled via network 100. An SCTP association 140 is established between the primary host 110 and the peer host 120. After establishing SCTP association 140 between the primary host 110 and the peer host 120, information about the SCTP association 140 is transferred to the backup host 130.

Figure 1B:
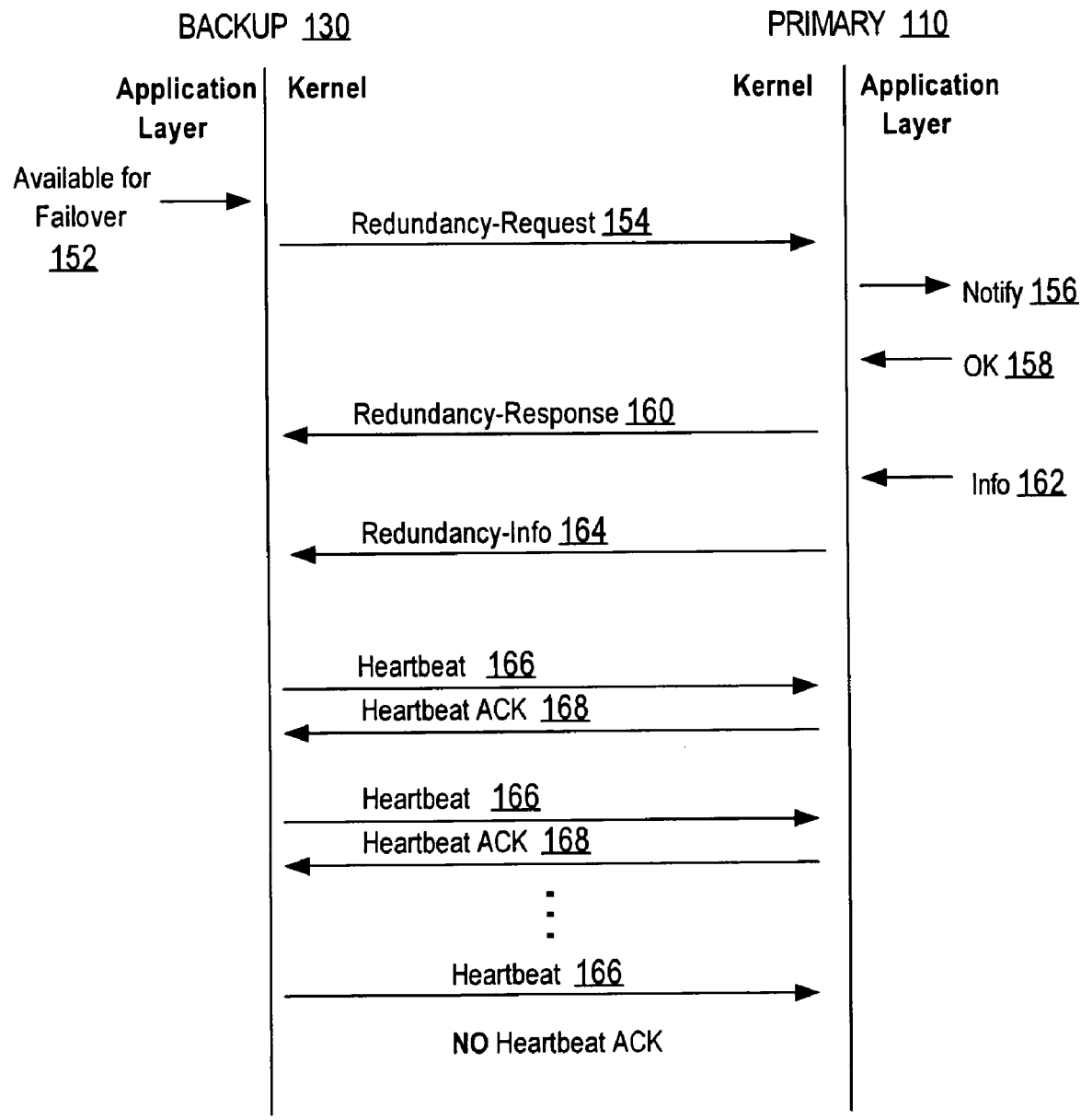
FIG. 1b is a block diagram that illustrates an overview of the communications between a primary host and a backup host in a system on which an embodiment is implemented.

FIG. 1b is a block diagram that illustrates an overview of the communications between primary host 110 and backup host 130 in a system on which an embodiment is implemented. An instance of an upper-layer application is running on the backup host 130 (the backup instance of the application). The backup instance sends to the SCTP stack, which runs in the kernel of backup host 130, a notification 152 that it is available to provide fail -over for an instance of the application running on the primary host 110 (the primary instance of the application). A message with a request for redundancy 154 is then sent from the backup host 130 informing the primary host 110 that the backup instance is available to provide fail-over for the primary instance of the application. The primary host 110 sends notification 156 informing the primary instance that the backup instance is available to provide redundancy. The primary instance sends notification 158 to the SCTP stack running on the primary host 110 that it agrees to accept the backup instance as its fail-over instance. The primary host 110 then sends a redundancy-response message 160 to the backup host 130 informing the backup host 130 that the backup instance is accepted as the fail-over instance for the primary instance of the application. The primary instance may refuse to accept the backup instance as its fail-over, in which case the notification 158 will be a denial of the request for redundancy (not shown), and the redundancy-response message 160 will inform the backup host 130 accordingly.

After establishing SCTP association 140 with the peer host 120, the primary host 110 receives a notification 162 from the primary instance of the application. The information in the notification may include one or more parameters that represent the state of the primary instance. The primary host 110 then sends a redundancy information message 164 that includes information about the SCTP association 140, and any information about the state of the primary instance that it may have received or it may have queried from the local kernel. The information about the SCTP association 140 may include a variety of parameters including, but not limited to, a verification tag of the SCTP association 140, the number of inbound and outbound streams, and a network address of the peer host 110.

The backup host 130 then begins monitoring to determine whether the primary instance of the application has failed. In FIG. 1b, the backup host 130 uses the heartbeat mechanism provided within SCTP to determine whether the primary host 110 is unavailable. The backup host 130 repeatedly sends heartbeat messages 166 to the primary host 110. The backup host 130 can send the heartbeat messages 166 over any available transport connection to the primary host 110. If the primary host 110 is available, it responds with a heartbeat acknowledgement message 168. If the backup host 130 does not receive a heartbeat acknowledgement message 168 in response to one or more of its heartbeat messages 166, the backup host 130 may conclude that the primary host 110, and respectively the primary instance of the application running on it, are unavailable.

In one embodiment, the backup host 130 sends the heartbeat message 166 over an SCTP connection to the primary host 110. In this embodiment, a HEARTBEAT control chunk in an SCTP packet sent to the primary host 110 represents the heartbeat message 166. The heartbeat acknowledgement message 168 is represented in this embodiment by a HEARTBEAT ACK chunk included in an SCTP packet sent from the primary host 110 to the backup host 130. However, the backup host 130 may employ any method to discover whether the primary instance of the application running on the primary host 110 has failed, including sending the heartbeat messages 166 and receiving the heartbeat acknowledgement messages 168 over non-SCTP transport connections.

Figure 2A:
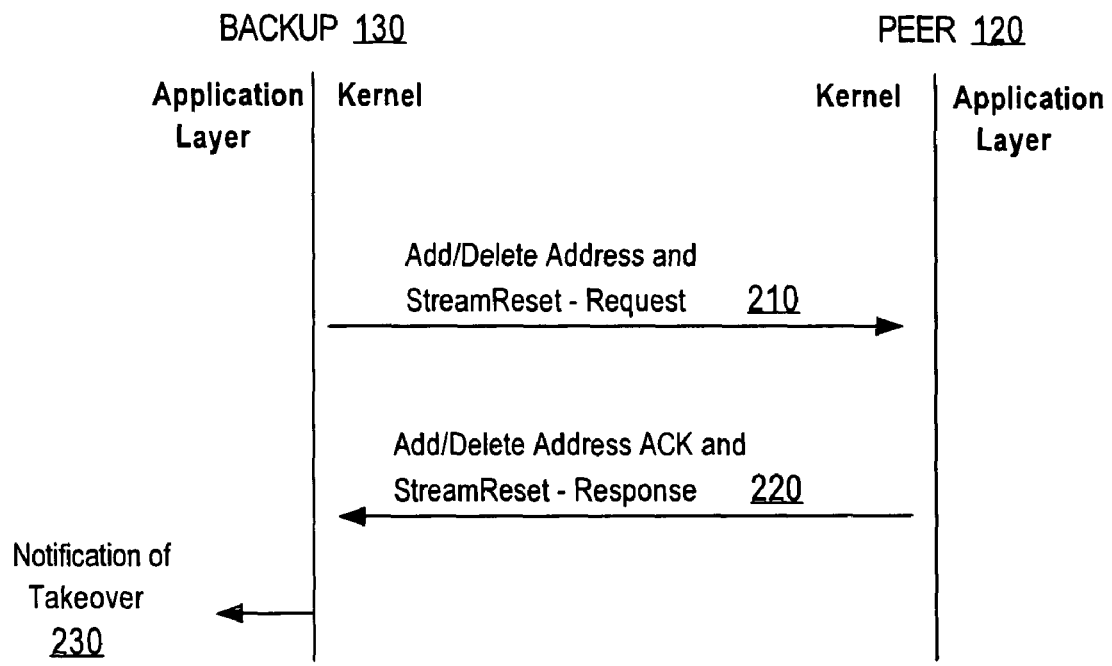
FIG. 2a is a block diagram that illustrates an overview of the communications between a backup host and a peer host for moving an SCTP association according to an embodiment.

Once the backup host 130 determines that the primary host 110 is unavailable, the backup host 130 sends a request to the peer host 120 to update the state of SCTP association 140. FIG. 2a is a block diagram that illustrates an overview of the communications between backup host 130 and peer host 120 in a system on which an embodiment is implemented. Backup host 130 sends message 210 to peer host 120 at a peer host's SCTP endpoint. Message 210 includes an Add/Delete Address Request and a Stream Reset Request, as well as the verification tag of SCTP association 140. Backup host 130 has previously received the verification tag of SCTP association 140 and the network addresses of the peer host 120 in a redundancy response message 164 from the primary host 110. Thus, backup host 130 can assemble an SCTP packet that includes the verification tag, an ASCONF chunk requesting adding the backup host's network address to SCTP association 140, and a STREAM RESET chunk requesting a reset of one or more streams of SCTP association 140.

Peer host 120 verifies that the verification tag included in the SCTP packet received in message 210 belongs to SCTP association 140, and sends to backup host 130 message 220. Message 220 includes an ASCONF ACK chunk and a STREAM RESET chunk with a Stream Reset Response parameter. Message 220 may also include the acknowledgment of the address change(s), and the current TSNs for SCTP association 140. Response 220 may further include either an acknowledgement that one or more streams of SCTP association 140 have been reset per the request, or the current SSNs for the streams if the backup host 130 did not request resetting of the streams. Backup host 130 receives Response message 220, and, based on the information received in the message, establishes SCTP association 140 with peer host 120. Thus, the state of SCTP association 140 is never reset or reinitialized because the association is merely re-established at the backup host 130 with parameters provided by peer host 120. Backup host 130 then sends notification 230 informing the backup instance of the application that it takes over for the failed primary instance.

Figure 2B:
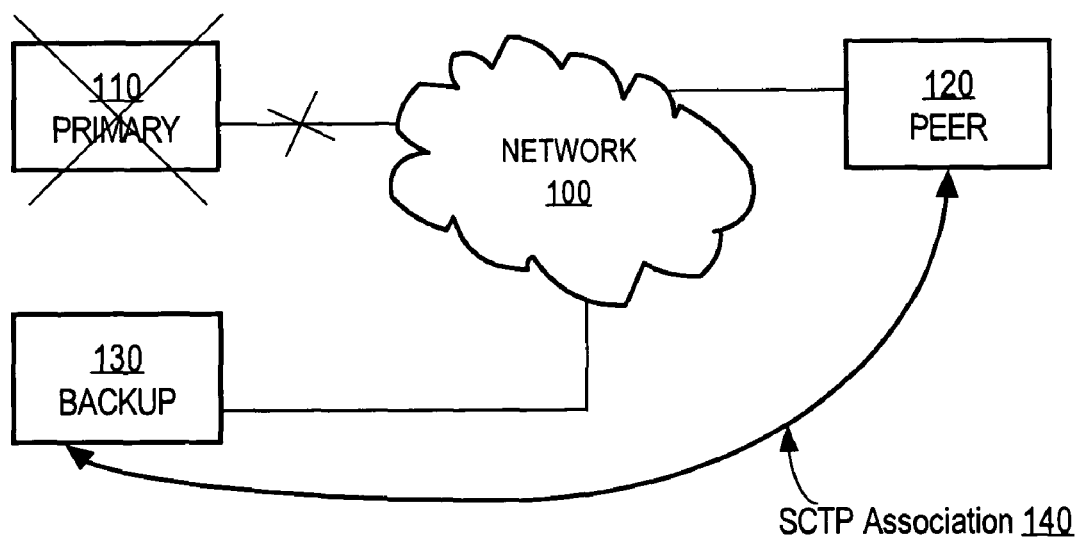
FIG. 2b is a block diagram that illustrates an overview of a system in which an SCTP association has been moved from one host to another according to an embodiment.

FIG. 2b is a block diagram that illustrates an overview of a system in which SCTP association 140 has been moved from primary host 110 to backup host 130 according to the embodiment described above. As illustrated in the figure, primary host 110 is shown to be unavailable. The unavailability of primary host 110 may be caused by a failure of the host itself, by a failure of the network link between the primary host 110 and network 100, or by a failure of a component of primary host 110.

Figure 3A:
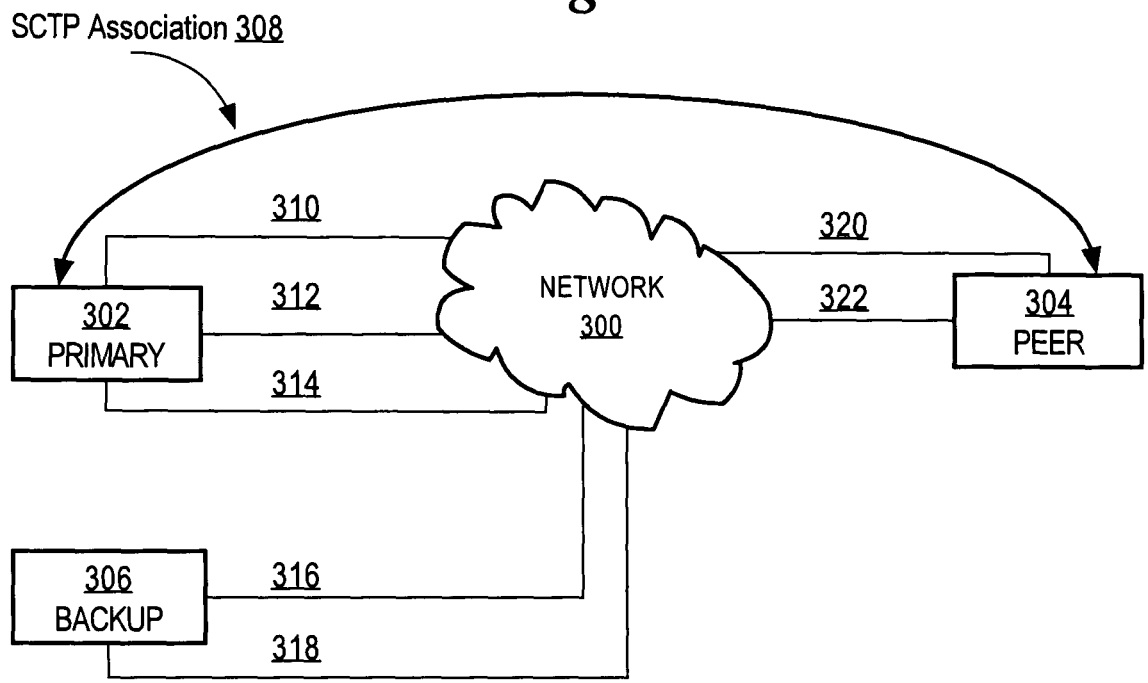
FIG. 3a is a block diagram that illustrates an overview of a system with multi-homed hosts on which an embodiment of a method for moving an SCTP association between hosts may be implemented.

FIG. 3a is a block diagram that illustrates an overview of a system with multi-homed hosts on which an embodiment of a method for moving an SCTP association between hosts may be implemented. Primary host 302 is communicatively connected to network 300 via links 310, 312, and 314, where a separate network address is associated with each link. Peer host 304 is communicatively connected to network 300 via links 320 and 322, where a separate network address is associated with each link. Backup host 306 is communicatively connected to network 100 via links 316 and 318, where a separate network address is associated with each link.

When SCTP association 308 between primary host 302 and peer host 304 is established, the network addresses associated with links 310, 312, and 314 are assigned to the primary host SCTP endpoint, and the network addresses associated with links 320 and 322 are assigned to the peer host SCTP endpoint. Subsequently, if primary host 302 becomes unavailable (because of a total host failure, a failure of a host component, or a failure of all three links 310, 312, and 314), the backup host 306 will detect the unavailability, and will send an Add/Delete Address Request to peer host 304 (as shown in message 210 in FIG. 2a) to add the backup host's network addresses to SCTP association 308 and to remove the primary host's network addresses from the association.

Figure 3B:
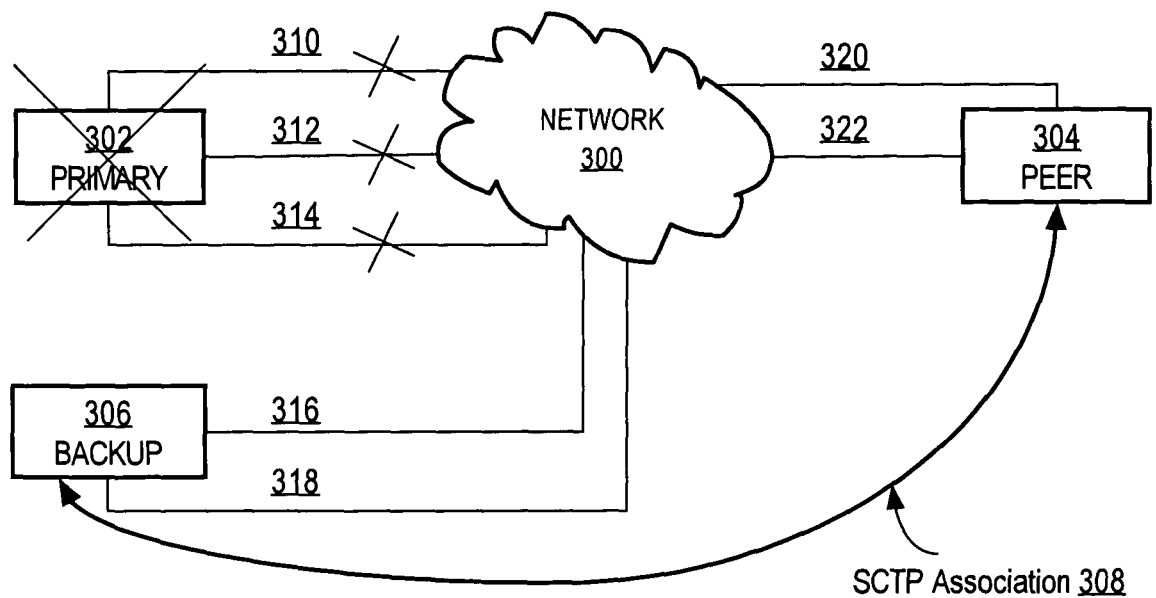
FIG. 3b is a block diagram that illustrates an overview of a system with multi-homed hosts in which an SCTP association has been moved from one host to another according to an embodiment.

Peer host 304 then updates SCTP association 308 by adding to the peer host association data structures the network addresses of the backup host SCTP endpoint (i.e. the network addresses associated with links 316, and 318), and by deleting from the peer host association data structures the network addresses of the primary host SCTP endpoint (i.e. the network addresses associated with links 310, 312, and 314). Peer host 304 then sends information about SCTP association 308 to backup host 306, and on the basis of this information, backup host 306 establishes SCTP association 308 at its end. FIG. 3b is a block diagram that illustrates the system depicted in FIG. 3a in which SCTP association 308 has been moved from multi-homed primary host 302 to multi-homed backup host 306 according to the embodiment of the invention described above.

2.2 Functional Overview of an Embodiment

Figure 4:
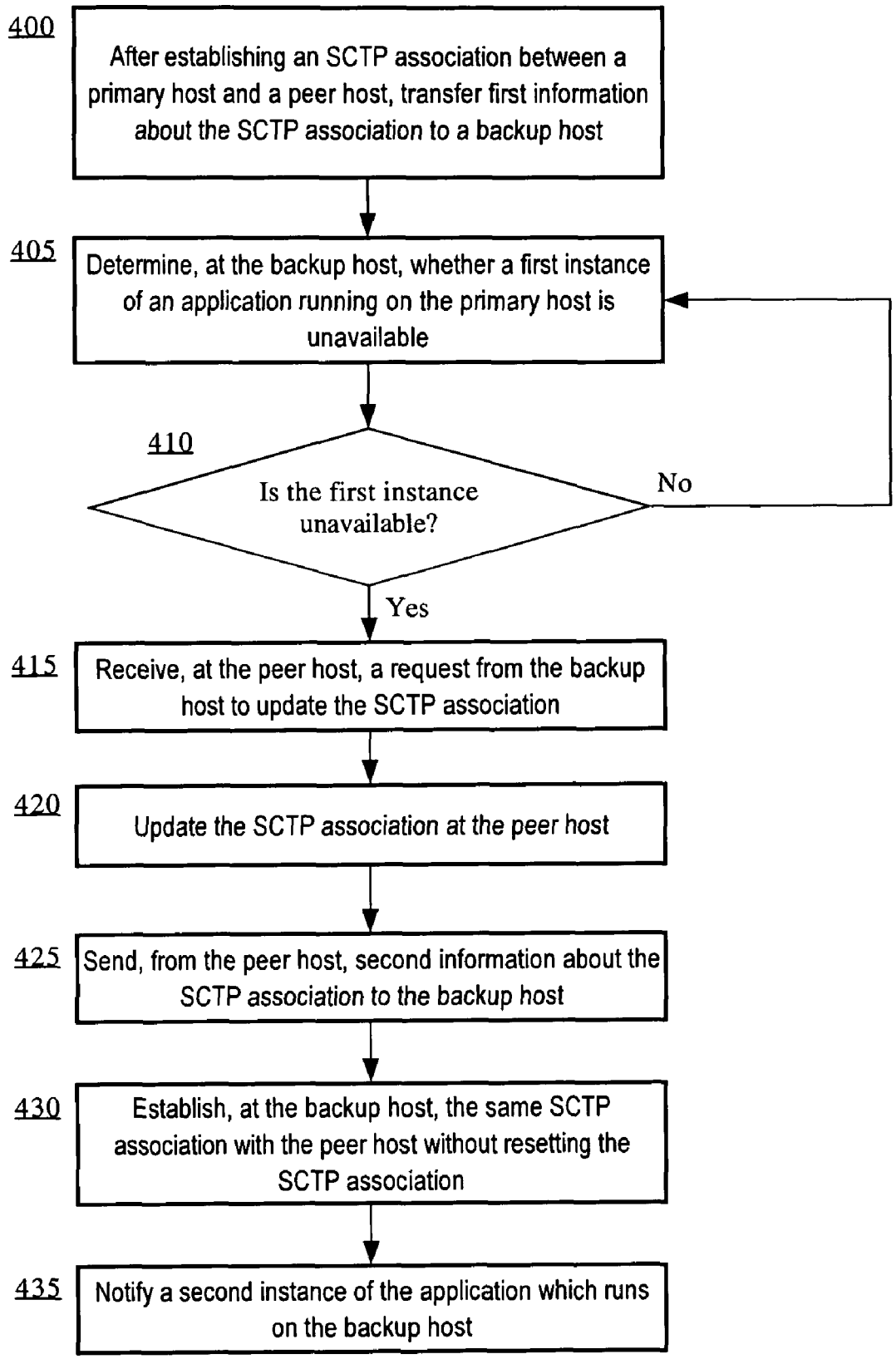
FIG. 4 is a flow diagram that illustrates a high level overview of one embodiment of a method for providing fault tolerance of an application over an SCTP transport connection.

FIG. 4 is a flow diagram that illustrates a high level overview of one embodiment of a method for providing fault tolerance of an application over an SCTP transport connection.

In Step 400, a primary host transfers to a backup host first information about an existing SCTP association between the primary host and a peer host. If the backup host is available before the SCTP association is established, Step 400 is performed after the SCTP association is established between the primary host and the peer host. If the backup host becomes available after the SCTP association between the primary host and the peer host has already been established, Step 400 is performed after the backup host has become available. The first information transferred in Step 400 may include a number of parameters of the SCTP association including, but not limited to, a verification tag of the association.

In Step 405, the backup host determines whether a primary instance of an application running on the primary host is unavailable. If the primary instance is available, in Step 410 the backup host continues by going back to Step 405 and determining again whether the first instance is unavailable. The backup host can perform Step 410 by monitoring to determine whether the primary host is unavailable through sending heartbeat messages to the primary host.

Step 410 can also be performed by a monitoring application running on the backup host, which monitoring application periodically checks the availability of the first instance on the primary host, and if the first instance becomes unavailable (while the primary host is still available), the monitoring application notifies the SCTP stack at the backup host. The monitoring application may be just another instance of the same application that is running on the primary host, or it may be any application designed specifically to monitor the availability of software applications.

The application, a primary instance of which is running on the primary host, can be any software application that can be performed by executing one or more sequences of instructions by a computer processor. Examples of such applications include, but are not limited to, a server application, a client application, a service, a process designed to run in the background (e.g. a daemon), a specific thread of an application or a process, and an Operating System (OS) process.

If in Step 410 the backup host determines that the first instance of the application running on the primary host is unavailable, in Step 415 the backup host sends a request to the peer host to update the SCTP association between the peer host and the primary host. In this step, the backup host may send to the peer host the verification tag of the SCTP association and a network address of the backup host.

In Step 420, the peer host updates the SCTP association with the information received in the request from the backup host. The peer host performs this Step by first verifying that the verification tag included in the SCTP packet carrying the request belongs to the SCTP association. Next, the peer host updates the addresses of the endpoints of the SCTP association by adding to the association the network address of the backup host received in the request, and, optionally, by deleting from the SCTP association the network address of the primary host. In this step, the peer host may reset the streams of the SCTP association (by setting the SSNs of the streams to zero or to another predetermined number) if the backup host requested from the peer host to do so.

In Step 425, the peer host sends information about the SCTP association to the backup host. This information may include one or more parameters of the SCTP association including, but not limited to, the stream numbers of one or more inbound and/or outbound streams of the SCTP association, the current SSNs for the streams, all the peer host network addresses, and the current TSNs.

In Step 430, the backup host receives the above information, and based on it establishes the SCTP association with the peer host. Specifically, the backup host initializes the data structures of the SCTP association on its end by using the parameters received from the peer host, and does not use the standard protocol method for establishing an SCTP association, for example, by sending an INIT chunk to the peer host, followed by receiving an INIT ACK chunk with a State Cookie parameter from the peer host, followed by sending to the peer host a COOKIE ECHO chunk, and followed by receiving from the peer host a COOKIE ACK chunk. In this way, the SCTP association is never reset or reinitialized at the peer host, and the backup host establishes the SCTP association at its end without going through any of the standard SCTP steps for establishing an association.

In Step 435, the backup host notifies the backup instance of the application that runs on the backup host that it must take over for the primary instance of the application that is running (or used to run) on the primary host. At this point, the backup instance of the application can transmit data to, and receive data from, the peer host over the SCTP association.

3.0 Method of Moving an SCTP Association without Resetting it 3.1 Transferring to the Backup Host Information About the SCTP Association After establishing an SCTP association between a primary host and a peer host, the primary host transfers to a backup host information about the SCTP association. The primary host may use any transport means to transfer the information (e.g. TCP, SCTP, etc.). This information contains all relevant information about the SCTP association, as it presently exists including, but not limited to, the SCTP association verifications tags, the number of inbound and outbound streams, and the present IP address bindings. If in the process of normal operation some of this information changes, for example, by adding an IP address to either of the SCTP association's endpoints, the primary host may update the backup host with the relevant changes.

3.2 Monitoring the Availability of the Primary Host

The backup host then monitors the availability of the primary host. The backup host may accomplish this by using any available mechanisms. In one embodiment, the backup host uses the SCTP heartbeat mechanism to send to the peer host HEARTBEAT chunks over an SCTP association between the primary and the backup hosts. The backup host recognizes that the primary host is unavailable when the backup host does not receive one or more HEARTBEAT ACK chunks in response to the HEARTBEAT chunks it sent to the primary host.

3.3 Updating the SCTP Association at the Peer Host 3.3.1 The ASCONF Chunk

When the backup host recognizes that the primary host is unavailable, the backup host sends a request to the peer host to update the SCTP association at the peer host end. The request includes an ASCONF chunk and a STREAM RESET chunk. The address reconfiguration ASCONF chunk includes a request to add the backup host's transport addresses (e.g. the IP address/port number combinations of the backup host). The ASCONF chunk may optionally include the transport addresses of the primary host with instructions to the peer host to delete these addresses from the SCTP association. If the primary host is truly unavailable, it may be preferable to delete the primary host's addresses from the SCTP association because otherwise the primary host's addresses are still part of the association and SCTP packets may still be sent from the peer host to these (now dead) primary host addresses.

3.3.2 The STREAM RESET Chunk

The STREAM RESET chunk is needed to obtain from the peer host the parameters representing the state of the SCTP association, including the current TSNs and, if needed, the current SSNs for the streams in the association or the stream numbers of the streams that were reset. The purpose of resetting a stream is to start the numbering sequence of the stream messages, the SSNs, back at zero (or at another predefined number) with a corresponding notification to the upper-layer application that this act has been performed. The upper-layer application may use this feature so that it can "re-use" streams for different purposes but still utilize the stream sequence number to track the flow of application data messages.

The STREAM RESET chunk includes four parameters: a chunk type field, a chunk flag field, a chunk length field, and a stream reset parameter. The chunk type field holds the value 0×82 that defines the chunk as a STREAM RESET chunk. The chunk flags field is set to zero by the sender and ignored by the receiver. The chunk length field holds the length of the chunk. A STREAM RESET chunk must not contain multiple stream reset parameters, and must hold one and only one stream reset parameter. An SCTP endpoint may have at most two STREAM RESET chunks in flight at any one single time: one STREAM RESET chunk holding a Stream Reset Request parameter, and optionally one STREAM RESET chunk holding a Stream Reset Response parameter.

The SCTP specification defines three stream reset parameters. The Supported Extensions parameter is used at startup to identify any additional extensions that the sending SCTP endpoint may support. The Stream Reset Request parameter is used by the sending SCTP endpoint to specify which stream or streams, if any, of the SCTP association are to be reset. This parameter includes a set of stream number fields to hold the stream numbers of the stream or streams that are to be reset. The Stream Reset Request parameter also includes: a bit that indicates whether the receiving SCTP endpoint is requested to reset the SSNs of the streams identified in the stream number fields; a bit that indicates whether the receiving SCTP endpoint is to reset the SSNs of all of it's outbound streams; and a bit indicating whether the receiving SCTP endpoint should send a Stream Reset Request to the sending SCTP endpoint asking the sending SCTP endpoint to reset the SSNs of its outbound streams (i.e. a reciprocal Stream Reset Request). The Stream Reset Request parameter also includes a Stream Reset Sequence Number field that holds a monotonically increasing number that is initialized to the same value as the initial TSN, and is used to tie the Stream Reset Request with its corresponding Stream Reset Response.

The Stream Reset Response parameter is used by the receiving SCTP endpoint to respond to the Stream Reset Request. It includes a bit indicating whether or not the receiving SCTP endpoint performed the Stream Reset Request received in the STREAM RESET chunk. The Stream Reset Response parameter also includes a Stream Reset Sequence Number field that holds the same value as the Stream Reset Sequence Number field in the Stream Reset Request parameter, and that is used to tie the Stream Reset Request to the Stream Reset Response. The Stream Reset Response parameter also includes one or more Stream Number fields that hold the stream numbers of the streams that were reset.

3.3.3 Sending Information About the SCTP Association to the Backup Host

When the peer host receives the ASCONF and the STREAM RESET chunks, it needs to process the ASCONF chunk before the STREAM RESET chunk, because a STREAM RESET chunk with a Stream Reset Response parameter would not normally be sent by the SCTP stack to an address that does not belong to the SCTP association. This means that if the backup host sends the ASCONF and the STREAM RESET chunks in one SCTP packet, then the ASCONF chunk needs to be placed in the packet before the STREAM RESET chunk. If the backup host sends the ASCONF and the STREAM RESET chunks in two different SCTP packets, the packet with the ASCONF chunk needs to be sent and received first. In either case, the backup host includes in the SCTP packet header the verification tag of the SCTP association that it received earlier from the primary host. The peer host then verifies that the verification tag in the SCTP packet header matches the verification tag of the SCTP association stored on the peer.

Thereafter, the peer host sends to the backup an ASCONF ACK chunk (to acknowledge that the backup host's transport address or addresses have been added to the association), and a STREAM RESET chunk with a Stream Reset Response parameter that contains the parameters representing the detailed state of the SCTP association. The peer host can send these two chunks in the same or in different SCTP packets.

3.4 Establishing the SCTP Association at the Backup Host without Resetting it

After the backup host receives the ASCONF ACK chunk, the backup host ascertains that its transport address or addresses have been successfully added to the SCTP association. Upon receipt of the STREAM RESET chunk, the backup host fully establishes the SCTP association with the peer host by using the information included in the Stream Reset Response parameter. The information included in the Stream Reset Response parameter of the STREAM RESET chunk indicates the current TSNs, and may include the stream numbers of the streams in the SCTP association for which the SSNs were reset. Once the backup host establishes the SCTP association, the upper-layer application can start transmitting data messages to, and receiving data messages from, the peer host over the association.

4.0 Method of Moving a DCCP Connection without Resetting it

The techniques described herein can be implemented for moving a DCCP connection from a first host to a second host on a network.

The unit of data transmitted over a DCCP connection is a DCCP packet. A DCCP packet includes, among other parameters, a Sequence Number (SN) that uniquely identifies the DCCP packet in the sequence of all packets a DCCP endpoint sends over a DCCP connection. The SN for a DCCP endpoint is initialized by a DCCP-Request or a DCCP-Response packet upon the establishment of the DCCP connection, and thereafter increases by one with every packet the endpoint sends. The DCCP-Sync and DCCP-SyncAck packets are used to synchronize the DCCP endpoints after detected loss of DCCP packets or after endpoint failure. Both the DCCP-Sync and DCP-SyncAck packets include an Acknowledgment Number field that holds the next valid SN for the endpoint that sends the DCCP-Sync or the DCCP-SyncAck.

In an example embodiment, after a first DCCP endpoint establishes a DCCP connection with a peer DCCP endpoint, the first DCCP endpoint transfers to a second DCCP endpoint information about the DCCP connection. The information may include the SN for the first DCCP endpoint, and any other DCCP connection parameters including, but not limited to, the congestion control ID of the connection, any congestion control window parameters, the DCCP Mobility ID of the first DCCP endpoint, and any other optional features of the DCCP connection that have been negotiated between the first DCCP endpoint and the peer DCCP endpoint. Thereafter, the first DCCP endpoint may periodically transfer, to the second DCCP endpoint, its current SN and any additional or optional features that may have been negotiated with the peer DCCP endpoint since the establishment of the connection.

Upon unavailability of the first DCCP endpoint, the second DCCP endpoint sends to the peer DCCP endpoint a request to update the DCCP connection. The request may include a DCCP-Sync packet in order to synchronize the second DCCP endpoint's SN with the peer DCCP endpoint. Depending on the mechanism employed by DCCP to provide for dynamic address reconfiguration, the request may further include one or more network addresses of the second DCCP endpoint. Alternatively, or in addition, the request may also include a DCCP-Move-Request packet that contains the Mobility ID of the first DCCP endpoint in order to signal to the peer DCCP endpoint that the DCCP connection is moving to the network address of the DCCP-Move-Request sender (i.e. the network address of the second DCCP endpoint).

Upon receiving the request to update the DCCP connection from the second DCCP endpoint, the peer DCCP endpoint updates the DCCP connection on its end, and sends information about the DCCP connection to the second DCCP endpoint. The information includes a DCCP-SyncAck packet that contains in its Acknowledgment Number field the current SN of the peer DCCP endpoint. This ensures that the second DCCP endpoint will have the proper sequence number for tracking the DCCP packets it will subsequently receive from the peer DCCP endpoint. Depending on the mechanism employed by DCCP to provide for dynamic address reconfiguration, the information may also include a DCCP-Move-Confirm packet to indicate that the peer DCCP endpoint acknowledges that the DCCP connection has moved, or is about to move, to the second DCCP endpoint.

Upon receiving the information from the peer DCCP endpoint, the second DCCP endpoint uses the current SN of the peer DCCP endpoint included in the information to re-establish the DCCP connection at its end without any connection reset. In this way, the DCCP connection between the peer DCCP endpoint and the first DCCP endpoint is established at the second DCCP endpoint without going through the normal steps of establishing a DCCP connection, i.e. without the exchange of DCCP-Request and DCCP-Response packets between the second DCCP endpoint and the peer DCCP endpoint.

5.0 Implementation Mechanisms—Hardware Overview

Figure 5:
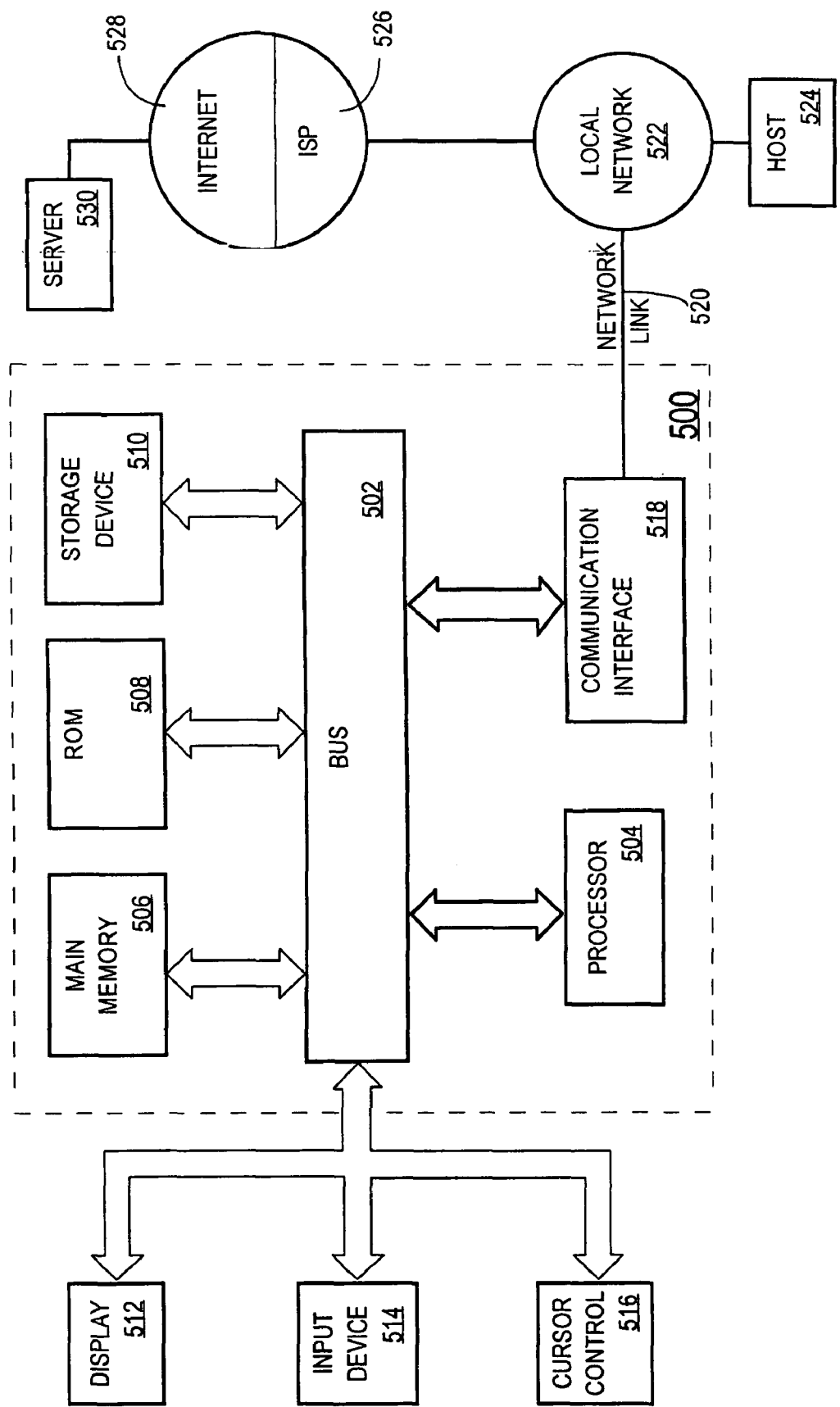
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for establishing and moving, without resetting, a transport connection to another computer system. According to one embodiment of the invention, the transport connection is an SCTP association and moving it without a connection reset is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for moving a transport connection among network hosts as described herein.

The received code may be executed by processor 504 as it is received, and/or stored in storage device 510, or other non-volatile storage for later execution. In this manner, computer system 500 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for moving a transport connection from a first host to a second host on a network, the method comprising the computer-implemented steps of:
   after establishing the transport connection between the first host and a peer host, the second host receiving first information about the transport connection from the first host;
   wherein the transport connection is not initially established between the second host and the peer host;
   upon unavailability of the first host, based on the first information, the second host sending to the peer host a request to obtain a current sequence number of the transport connection and to update the transport connection at the peer host;

in response to the request, the second host receiving from the peer host second information about the transport connection;

wherein the second information comprises the current sequence number of the transport connection; and without resetting the transport connection, the second host establishing the transport connection with the peer host based at least on the second information;

wherein the second host establishing the transport connection comprises using at least the current sequence number stored in the second information to set up the transport connection at the second host;

wherein the steps of the method are performed by one or more computer systems that comprise the second host.

2. A method as recited in claim 1, wherein the transport connection is a Stream Control Transmission Protocol (SCTP) association.

3. A method as recited in claim 2, wherein:
the first information comprises a verification tag of the SCTP association; and
the request to obtain the current sequence number and to update the SCTP association comprises:
the verification tag; and
an address of the second host.

4. A method as recited in claim 3, wherein:
the step of sending to the peer host the request to obtain the current sequence number and to update the SCTP association comprises causing the peer host to:
verify that the verification tag belongs to the SCTP association;
add the address of the second host to the SCTP association; and
send the second information about the SCTP association to the second host at the address of the second host.

5. A method as recited in claim 4, wherein the current sequence number is a current Transmission Sequence Number (TSN) of the SCTP association.

6. A method as recited in claim 5, wherein the second information further comprises the stream numbers of one or more streams in the SCTP association.

7. A method as recited in claim 3, wherein the address of the second host is an Internet Protocol (IP) address.

8. A method as recited in claim 3, wherein the request to obtain the current sequence number and to update the SCTP association further comprises:
a first message including the verification tag; and
a second message including the address of the second host.

9. A method as recited in claim 2, further comprising monitoring to determine whether the first host is unavailable.

10. A method as recited in claim 2, further comprising the step of charging a fee, to an entity that uses at least one of the first host and the second host, for establishing the SCTP association.

11. A method as recited in claim 2, further comprising the step of updating an account record in a database, wherein the account record is associated with an entity that uses at least one of the first host and the second host, wherein the updating represents charging a fee to an account of the entity for establishing the SCTP association.

12. A method as recited in claim 2, wherein:
the step of sending to the peer host the request to obtain the current sequence number and to update the SCTP association comprises causing the peer host to set the Stream Sequence Numbers (SSNs) of one or more streams of the SCTP association to a predetermined value; and
the step of the second host establishing the SCTP association with the peer host comprises setting the Stream Sequence Numbers (SSNs) of said one or more streams of the SCTP association to the predetermined value.

13. A method as recited in claim 1, wherein the transport connection is a Datagram Congestion Control Protocol (DCCP) connection.

14. A method as recited in claim 1, further comprising the steps of:
upon the first host becoming available, requesting from the peer host to move the transport connection back to the first host;
wherein requesting from the peer host to move the transport connection comprises causing the peer host to update the transport connection to indicate that the transport connection is moving back to the first host;
the second host receiving a notification that the transport connection is moving back to the first host; and
without resetting the transport connection, causing the first host to re-establish the transport connection with the peer host.

15. A method for providing fault tolerance of an application over a Stream Control Transmission Protocol (SCTP), the method comprising the computer-implemented steps of:
after establishing an SCTP association between a primary host and a peer host, a backup host receiving first information about the SCTP association from the primary host, wherein:
the primary host runs a first instance of an application; and
the backup host runs a second instance of the application;
wherein the SCTP association is not initially established between the backup host and the peer host;
at the backup host, monitoring to determine whether the first instance of the application has become unavailable;
when the first instance of the application has become unavailable, based on the first information, the backup host sending to the peer host a request to obtain a current Transmission Sequence Number (TSN) of the SCTP association and to update the SCTP association at the peer host;
in response to the request, the backup host receiving from the peer host second information about the SCTP association;
wherein the second information comprises the current TSN of the SCTP association;
without resetting the SCTP association, the backup host establishing the SCTP association with the peer host based at least on the second information;
wherein the backup host establishing the SCTP association comprises using at least the current TSN stored in the second information to set up the SCTP association at the backup host; and
notifying the second instance of the application at the backup host;
wherein the steps of the method are performed by one or more computer systems that comprise the backup host.

16. A method as recited in claim 15, wherein:
the first information comprises a verification tag of the SCTP association; and
the request to obtain the current TSN and to update the SCTP association comprises:
the verification tag; and
an address of the backup host.

17. A method as recited in claim 16, wherein:
the step of sending to the peer host the request to obtain the current TSN and to update the SCTP association comprises causing the peer host to:

verify that the verification tag belongs to the SCTP association;
add the address of the backup host to the SCTP association; and
send the second information about the SCTP association to the backup host at the address of the backup host.

18. A method as recited in claim 17, wherein the second information further comprises the stream numbers of one or more streams in the SCTP association.

19. A method as recited in claim 17, wherein:
the method further comprises the step of the backup host receiving, from the peer host, one or more parameters representing a state of the first instance of the application; and
the step of notifying the second instance further includes the backup host transferring the one or more parameters to the second instance of the application.

20. A method as recited in claim 16, wherein the address of the backup host is an Internet Protocol (IP) address.

21. A method as recited in claim 16, wherein the request to obtain the current TSN and to update the SCTP association further comprises:
a first message including the verification tag; and
a second message including the address of the backup host.

22. A method as recited in claim 15, wherein the step of monitoring to determine whether the first instance of the application has become unavailable includes monitoring to determine whether the primary host has become unavailable.

23. A method as recited in claim 22, wherein monitoring to determine whether the primary host has become unavailable includes sending heartbeat messages to the primary host.

24. A method as recited in claim 15, wherein:
the application implements Border Gateway Protocol (BGP); and
the peer host runs a third instance of the application.

25. A method as recited in claim 15, wherein the step of sending to the peer host the request to obtain the current TSN and to update the SCTP association further comprises causing the peer host to delete a primary host address from the SCTP association.

26. A method as recited in claim 15, further comprising the step of requesting the first instance of the application to acknowledge the second instance of the application as a failover instance.

27. A method as recited in claim 15, wherein:
the step of sending to the peer host the request to obtain the current TSN and to update the SCTP association comprises causing the peer host to set the Stream Sequence Numbers (SSNs) of one or more streams of the SCTP association to a predetermined value; and
the step of the backup host establishing the SCTP association with the peer host comprises setting the Stream Sequence Numbers (SSNs) of said one or more streams of the SCTP association to the predetermined value.

28. A computer-readable non-transitory storage medium storing one or more sequences of instructions for moving a transport connection from a first host to a second host on a network, which instructions, when executed by one or more processors, cause the one or more processors to carry out the steps of:
after establishing the transport connection between the first host and a peer host, the second host receiving first information about the transport connection from the first host;
wherein the transport connection is not initially established between the second host and the peer host;
upon unavailability of the first host, based on the first information, the second host sending to the peer host a request to obtain a current sequence number of the transport connection and to update the transport connection at the peer host;
in response to the request, the second host receiving from the peer host second information about the transport connection;
wherein the second information comprises the current sequence number of the transport connection; and
without resetting the transport connection, the second host establishing the transport connection with the peer host based at least on the second information;
wherein the second host establishing the transport connection comprises using at least the current sequence number stored in the second information to set up the transport connection at the second host.

29. A computer-readable non-transitory storage medium storing one or more sequences of instructions for providing fault tolerance of an application over a Stream Control Transmission Protocol (SCTP), which instructions, when executed by one or more processors, cause the one or more processors to carry out the steps of:
after establishing an SCTP association between a primary host and a peer host, a backup host receiving first information about the SCTP association from the primary host,
wherein:
the primary host runs a first instance of an application; and the backup host runs a second instance of the application;
wherein the SCTP association is not initially established between the backup host and the peer host;
at the backup host, monitoring to determine whether the first instance of the application has become unavailable;
when the first instance of the application has become unavailable, based on the first information, the backup host sending to the peer host a request to obtain a current Transmission Sequence Number (TSN) of the SCTP association and to update the SCTP association at the peer host;
in response to the request, the backup host receiving from the peer host second information about the SCTP association;
wherein the second information comprises the current TSN of the SCTP association; without resetting the SCTP association, the backup host establishing the SCTP association with the peer host based at least on the second information;
wherein the backup host establishing the SCTP association comprises using at least the current TSN stored in the second information to set up the SCTP association at the backup host; and notifying the second instance of the application at the backup host.

30. An apparatus comprising:
one or more processors; and
logic encoded in one or more tangible media for execution and when executed operable to:
receive first information about a transport connection from a first host, wherein the transport connection is established between the first host and a peer host;
wherein the transport connection is not initially established between the peer host and the apparatus;
upon unavailability of the first host, based on the first information, send to the peer host a request to obtain a current sequence number of the transport connection and to update the transport connection at the peer host;

in response to the request, receive from the peer host second information about the transport connection;
wherein the second information comprises the current sequence number of the transport connection; and
without resetting the transport connection, establish the transport connection with the peer host based at least on the second information;
wherein the logic operable to establish the transport connection comprises logic operable to use at least the current sequence number stored in the second information to set up the transport connection at the apparatus.

31. The apparatus of claim 30, wherein the transport connection is one of a Stream Control Transmission Protocol (SCTP) association and a Datagram Congestion Control Protocol (DCCP) connection.

32. The apparatus of claim 30, wherein:
the transport connection is a Stream Control Transmission Protocol (SCTP) association;
the first information comprises a verification tag of the SCTP association; and
the request to obtain the current sequence number and to update the SCTP association comprises:
the verification tag; and
an address of the apparatus.

33. The apparatus of claim 32, wherein:
the logic operable to send to the peer host the request to obtain the current sequence number and to update the SCTP association is further operable to cause the peer host to:
verify that the verification tag belongs to the SCTP association;
add the address of the apparatus to the SCTP association;
set the Stream Sequence Numbers (SSNs) of one or more streams of the SCTP association to a predetermined value; and
send the second information about the SCTP association to the address of the apparatus; and
the logic operable to establish the SCTP association with the peer host is further operable to set the Stream Sequence Numbers (SSNs) of the one or more streams of the SCTP association to the predetermined value.

34. The apparatus of claim 30, wherein:
the transport connection is a Stream Control Transmission Protocol (SCTP) association;
the current sequence number is a current Transmission Sequence Number (TSN) of the SCTP association; and
the second information further comprises the stream numbers of one or more streams in the SCTP association.

35. The apparatus of claim 30, wherein the logic is further operable to perform monitoring to determine whether the first host is unavailable.

36. An apparatus comprising:
one or more processors; and
logic encoded in one or more tangible media for execution and when executed operable to:
receive first information about a Stream Control Transmission Protocol (SCTP) association from a primary host, wherein the SCTP association is established between the primary host and a peer host, and wherein:
the primary host executes a first instance of an application; and
a second instance of the application is executed by the one or more processors;
wherein the SCTP association is not initially established between the peer host and the apparatus;
monitor to determine whether the first instance of the application has become unavailable;
based on the first information, send to the peer host a request to obtain a current Transmission Sequence Number (TSN) of the SCTP association and to update the SCTP association at the peer host when the first instance of the application has become unavailable;
in response to the request, receive from the peer host second information about the SCTP association;
wherein the second information comprises the current TSN of the SCTP association;
without resetting the SCTP association, establish the SCTP association with the peer host based at least on the second information; and
notify the second instance of the application;
wherein the logic operable to establish the SCTP association comprises logic operable to use at least the current TSN stored in the second information to set up the SCTP association at the apparatus.

37. The apparatus of claim 36, wherein:
the first information comprises a verification tag of the SCTP association; and
the request to obtain the current TSN and to update the SCTP association comprises:
the verification tag; and
an address of the apparatus.

38. The apparatus of claim 36, wherein the logic operable to send to the peer host the request to obtain the current TSN and to update the SCTP association is further operable to cause the peer host to delete a primary host address from the SCTP association.

39. The apparatus of claim 36, wherein:
the second information further comprises:
the stream numbers of one or more streams in the SCTP association; and
one or more parameters representing a state of the first instance of the application;
the logic operable to establish the SCTP association comprises logic operable to use the stream numbers of the one or more streams to set up the SCTP association at the apparatus; and
the logic operable to notify the second instance is further operable to transfer the one or more parameters to the second instance of the application.

40. The apparatus of claim 36, wherein:
the application implements Border Gateway Protocol (BGP);
the peer host executes a third instance of the application; and
the logic is further operable to request the first instance of the application to acknowledge the second instance of the application as a failover instance.

* * * * *